(12) United States Patent
Malik et al.

(10) Patent No.: US 8,499,048 B2
(45) Date of Patent: Jul. 30, 2013

(54) INDEXING AND ORGANIZING MESSAGES IN A MESSAGING SYSTEM USING SOCIAL NETWORK INFORMATION

(75) Inventors: Prashant Malik, Union City, CA (US); Jiakai Liu, Palo Alto, CA (US); Andrew G. Bosworth, Palo Alto, CA (US); Joel Benjamin Seligstein, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 114 days.

(21) Appl. No.: 12/913,701

(22) Filed: Oct. 27, 2010

(65) Prior Publication Data

US 2012/0110085 A1    May 3, 2012

(51) Int. Cl.
*G06F 15/16* (2006.01)
(52) U.S. Cl.
USPC ............................ 709/206; 709/203; 709/217
(58) Field of Classification Search
USPC ......................... 709/203, 206, 207, 223, 224
See application file for complete search history.

(56) References Cited

U.S. PATENT DOCUMENTS

| | | | |
|---|---|---|---|
| 7,328,242 B1 | 2/2008 | McCarthy et al. | |
| 7,627,828 B1 * | 12/2009 | Collison et al. | 715/752 |
| 8,095,613 B1 * | 1/2012 | Perkowitz et al. | 709/207 |
| 8,126,973 B2 * | 2/2012 | Bryant et al. | 709/206 |
| 8,141,133 B2 * | 3/2012 | Pagan | 726/3 |
| 8,370,423 B2 * | 2/2013 | Ozzie et al. | 709/203 |
| 2002/0116466 A1 * | 8/2002 | Trevithick et al. | 709/206 |
| 2003/0105827 A1 | 6/2003 | Tan et al. | |
| 2003/0185379 A1 | 10/2003 | O'Connor et al. | |
| 2005/0171954 A1 | 8/2005 | Hull et al. | |
| 2005/0267944 A1 * | 12/2005 | Little | 709/207 |
| 2006/0026298 A1 * | 2/2006 | Zeng et al. | 709/240 |
| 2006/0031329 A1 | 2/2006 | Robertson | |
| 2006/0069732 A1 * | 3/2006 | Shannon et al. | 709/206 |
| 2006/0195533 A1 * | 8/2006 | Isozaki et al. | 709/206 |
| 2006/0294134 A1 * | 12/2006 | Berkhim et al. | 707/102 |
| 2007/0005654 A1 | 1/2007 | Schachar et al. | |
| 2007/0005713 A1 | 1/2007 | LeVasseur et al. | |
| 2007/0011236 A1 * | 1/2007 | Ravula | 709/204 |
| 2007/0185961 A1 | 8/2007 | Perlow et al. | |
| 2007/0250585 A1 * | 10/2007 | Ly et al. | 709/206 |
| 2008/0005249 A1 * | 1/2008 | Hart | 709/206 |
| 2008/0028031 A1 | 1/2008 | Bailey et al. | |
| 2008/0162649 A1 * | 7/2008 | Lee et al. | 709/206 |
| 2008/0250332 A1 | 10/2008 | Farrell et al. | |

(Continued)

OTHER PUBLICATIONS

PCT International Search Report and Written Opinion, PCT Application No. PCT/US2011/047643, Dec. 22, 2011, five pages.

*Primary Examiner* — Lashonda Jacobs
(74) *Attorney, Agent, or Firm* — Fenwick & West LLP

(57) ABSTRACT

A messaging system receives a message that is intended for a recipient, who is a user of a social networking system. An object associated with the message is identified based on the message content and/or metadata associated with the message. The messaging system accesses a social networking system database to obtain social information about a relationship between the recipient and the identified object. The message is then indexed using the social information, wherein an entry for the message is stored in a message index based on the social information. This process may be repeated for each received message, and multiple different message indexes may be generated for received messages to track different types of social information. A user interface for viewing messages uses the message index to organize the messages, such as to filter, categorize, and/or sort the messages in the display.

17 Claims, 3 Drawing Sheets

U.S. PATENT DOCUMENTS

| | | |
|---|---|---|
| 2008/0250335 A1 | 10/2008 | Gusler et al. |
| 2009/0030857 A1 | 1/2009 | Horvitz et al. |
| 2009/0031232 A1 | 1/2009 | Brezina et al. |
| 2009/0031244 A1 | 1/2009 | Brezina et al. |
| 2009/0037350 A1 | 2/2009 | Rudat |
| 2009/0119167 A1 | 5/2009 | Kendall et al. |
| 2010/0318571 A1 | 12/2010 | Pearlman et al. |
| 2010/0318613 A1* | 12/2010 | Souza et al. ................ 709/206 |
| 2011/0041082 A1 | 2/2011 | Nguyen |
| 2011/0055309 A1 | 3/2011 | Gibor et al. |
| 2011/0082906 A1 | 4/2011 | Kreig et al. |
| 2011/0302250 A1 | 12/2011 | Plotts et al. |
| 2012/0054132 A1 | 3/2012 | Aberdeen et al. |
| 2012/0089681 A1* | 4/2012 | Chowdhury et al. ......... 709/206 |
| 2012/0110096 A1* | 5/2012 | Smarr et al. ................. 709/206 |
| 2012/0131474 A1 | 5/2012 | Panchadsaram et al. |
| 2012/0265824 A1 | 10/2012 | Lawbaugh |

* cited by examiner

INDEXING AND ORGANIZING MESSAGES IN A MESSAGING SYSTEM USING SOCIAL NETWORK INFORMATION

BACKGROUND

This invention relates generally to messaging systems, and more specifically to indexing and organizing messages for a user of a social networking system using social network information.

People communicate with each other in an online environment by sending and receiving messages. One area in which large numbers of messages are involved is in social networking. Social networking systems allow users to form relationships with other users, applications, events, and many other objects. Users can then communicate with other users in the social network by sending messages such as electronic mail ("e-mail") and chat messages.

Due to the vast number of users and objects in a social networking system, a user can quickly be overwhelmed by a constant stream of incoming messages. In addition, messages may come from sources that are outside of the social networking system. It is difficult for a user to determine what messages are important without identifying the source of the message or reading part of the message itself, such as the title or body of the message. Further, a user's mailbox may contain millions of lines of text in tens of thousands of messages collected over decades of use, making it even more difficult for a user to distinguish relevant messages from non-relevant messages.

SUMMARY

Embodiments of the invention leverage the social network information for a user of a social networking system to organize and display messages for the user in a messaging system. In this way, users of a social networking system can better identify messages by their social relevance based on the users' social relationships in the social networking system.

In one embodiment, a messaging system receives a message that is intended for a recipient, who is a user of a social networking system. An object associated with the message is identified based on the message content and/or metadata associated with the message. For example, the object may be another user in the social networking system that sent the message. The messaging system accesses a social networking system database to obtain social information about a relationship between the recipient and the identified object. In the above example, the social information may indicate whether the recipient and sender have established a connection in the social networking system. The message is then indexed using the social information, wherein an entry for the message is stored in a message index based on the social information. This process may be repeated for each received message, and multiple different message indexes may be generated for received messages to track different types of social information.

The message index thus provides contextual information about the social relevance of the messages for the recipient of the message. The message index enables messages to be processed and presented in a number of useful ways. In one embodiment, the messaging system provides a user interface to the user of the social networking system, where the user interface displays a plurality of messages associated with the user (i.e. messages from the user's mailbox). To organize the messages in the user interface, the messaging system accesses the index to obtain social information for each of a plurality of messages and organizes the messages at least in part based on the social information associated with the messages. The organizing may comprise sorting, categorizing, and/or filtering the messages in the display, among various other organizing schemes that can leverage the message index. For example, messages received from friends of the user can quickly be identified as such and displayed to the user, thereby providing the user with messages that are socially relevant to the user. Further, the message index enables social context for the messages to be identified quickly while only consuming a small amount of computing resources, rather than requiring the messaging system to access the social networking system database whenever messages are to be displayed.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Configuration Overview

Figure 1:
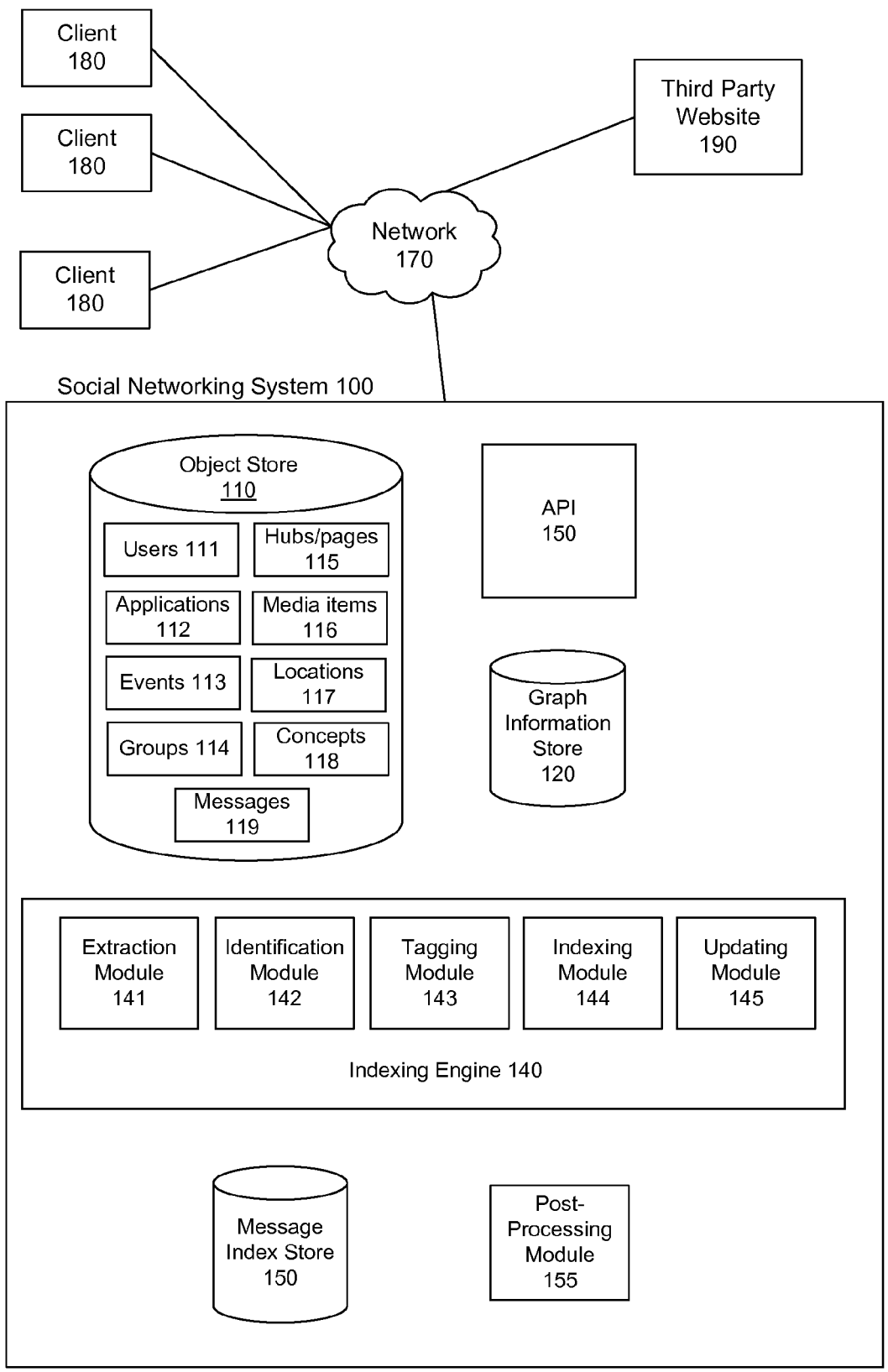
FIG. 1 is a high-level block diagram of a messaging system for indexing and organizing messages for a user of a social networking system using social network information, according to one embodiment.

FIG. 1 is a high-level block diagram of a messaging system for indexing and organizing messages for a user of a social networking system using social network information, according to one embodiment. FIG. 1 illustrates a social networking system 100, multiple client devices 180, and a third party website 190 connected by a network 170. In one embodiment, the social networking system 100, client devices 180, and third party website 190 each comprise of one or more computers. Additionally, the client devices 180 may comprise any type of computing device capable of sending or receiving messages, such as a mobile phone, laptop, netbook, tablet, cable box, television, etc.

A user of the client device 180 interacts with the social networking system 100 via an application, such as a web browser or a native application, to perform operations such as browsing content, posting and sending messages, retrieving and sorting messages received from other users, and the like. Additionally, the third party website 190 can also interact with the social networking system 100 via a system-provided application programming interface (API) 150. For example, the third party website can perform operations supported by the API, such as delivering messages to the social network system 100, retrieving messages stored by the social networking system 100, and obtaining social information about users of the social networking system 100.

The social networking system 100 comprises an object store 110, a graph information store 120, an indexing engine 140, and a post-processing module 155. The object store 110 stores information on objects represented in or by the social networking environment. The graph information store 120 stores information on the relationships of the objects in the object store 110. The indexing engine 140 receives messages from various sources, such as client devices 180 and third party website 190. Messages can be in any electronic message format such as electronic mail ("e-mail") messages, chat messages, comments left on a user's webpage, and short message service (SMS) text messages. The indexing engine 140 indexes the messages into the message index store 150 using social relationship information from the graph information store 120. For example, a message sent from Adam to Bob, who are friends, can be tagged as being from a friend and indexed using this social relationship information. The post-processing module 155 uses the message index store 150 to generate a set of messages that can be presented to a user of client device 180.

Social Graph Configuration

The object store 110 stores information on various objects tracked by the social networking system 100. These objects may represent a variety of things with which a user may interact in the social networking system 100, including, without limitation, other users 111 of the social networking system (represented, e.g., as a profile object for the user), applications 112 (e.g., a game playable within the social networking system), events 113 (e.g., a concert that users may attend), groups 114 to which users may belong, pages or hubs 115 (e.g., pages constituting a particular organization's presence on the system), items of media 116 (e.g., pictures, videos, audio, text, or any other type of media content), locations 117 associated with a user (e.g., "Santa Clara, Calif., USA"), and even concepts 118 or other terms (e.g., "Victorian literature"). An object in the object store 110 may represent an entity existing within the social networking system (e.g., an application 112 available on the social networking system), a virtual entity that exists outside the domain of the social networking system (e.g., a website), or a real-world entity (e.g., a sports team or a retail store). The object store 110 may further store objects representing other data routinely produced by users of the social networking system 100, such as messages 119, status updates, photos, and videos.

The object store 110 may store all of the objects existing within the social networking system 100, such as messages 119, or the image data associated with an image media item 116. Alternatively, for virtual entities existing outside of the social networking system 100, the object store 110 may contain some form of pointer or reference to the entities, such as the uniform resource locator (URL) of an external media item 116. Additionally, the object store 110 may also store metadata associated with the objects, such as a name describing the object (e.g. "Charles Williams" for a person, "Birthday Reminder" for an application, or "Penguin Fanciers" for a group), an image representing the object (e.g., a user profile picture), one or more labels assigned to the object by users (e.g. the textual strings "game", "crime", and "strategy" for a strategy game application), or different e-mail addresses of a user object (e.g. "jeremy1234@gmail.com" and "jeremy1234@yahoo.com"). Different types of objects may have different types of metadata, such as a set of associated users 111 for a group 114, a media type (e.g., "video") for a media item object 116, and a unique user ID and name tokens (e.g., separate first and last names "Charles" and "Williams") for a user object 111.

The graph information store 120 represents the objects of the object store 110 as nodes that are linked together in a "social graph." The graph information store 120 thus comprises information about the relationships between or among the objects, represented as the edges connecting the various object nodes. Various examples of edges in the social graph include: an edge between two user objects representing that the users are have a relationship in the social networking system (e.g., are friends, or have communicated, viewed the other's profile, or interacted in some way), an edge between a user object and an application object representing that the user has used the application, an edge between a user object and a group object representing that the user belongs to the group, and an edge between a user object and a page object representing that the user has viewed the page, to name just a few. For example, if one user establishes a relationship with another user in the social networking system, the two users are each represented as a node, and the edge between them represents the established relationship; the two users are then said to be connected in the social network system. Continuing this example, one of these users may send a message to the other user within the social networking system. This act of sending the message is another edge between those two nodes, which can be stored and/or tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the indication of whether or not the user will attend the event is the edge. Using a social graph, therefore, a social networking system may keep track of many different types of objects and edges (the interactions and connections among those objects), thereby maintaining an extremely rich store of socially relevant information.

In one embodiment, edges in the graph information store 120 have associated metadata, such as a label describing the type of relationship (e.g., "friend" as the label between two user objects, "family" as the label between brother and sister), or an affinity value quantifying the strength of the relationship. Further, a relationship degree, or "distance," between any two objects can be ascertained by determining the number of edges on the shortest path between the objects. For example, two user objects that have an edge between them (e.g., denoting a friendship relationship) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

In one embodiment, the social networking system 100 adds information to the graph information store 120 in real time as it observes events taking place indicating relationships between the various objects, such as a user 111 interacting with an application 112. Alternatively and/or additionally, the graph information store 120 may be created based on existing stored information from which relationships can be inferred. For example, the friend list of a user 111 might indicate that the user has a friend relationship with another user, or the data for a group 114 might indicate that some set of users has a membership relationship with that group, and this information could be reflected in the graph information store 120.

U.S. application Ser. No. 12/193,702, filed Aug. 18, 2008, which is incorporated by reference in its entirety, describes an example of a social networking system that maintains data for a number of different types of objects used by the social networking system. U.S. application Ser. No. 12/485,856, filed Jun. 16, 2009, which is incorporated by reference in its entirety, describes embodiments of a social networking system that maintains objects and connections among the objects in a social graph.

Indexing and Organizing Messages

The social networking system 100 comprises an indexing engine 140 that receives and indexes messages using relationships in the social graph (e.g., relationship between the sender and recipient of a message). The indexes enable the social networking system 100 to efficiently process and generate a set of messages based on social relationship criteria. For example, the post-processing module 155 can use the indexes to filter indexed messages by social relationship, thereby presenting a user of the social network system 100 with only the messages that are socially relevant to that particular user.

Figure 2:
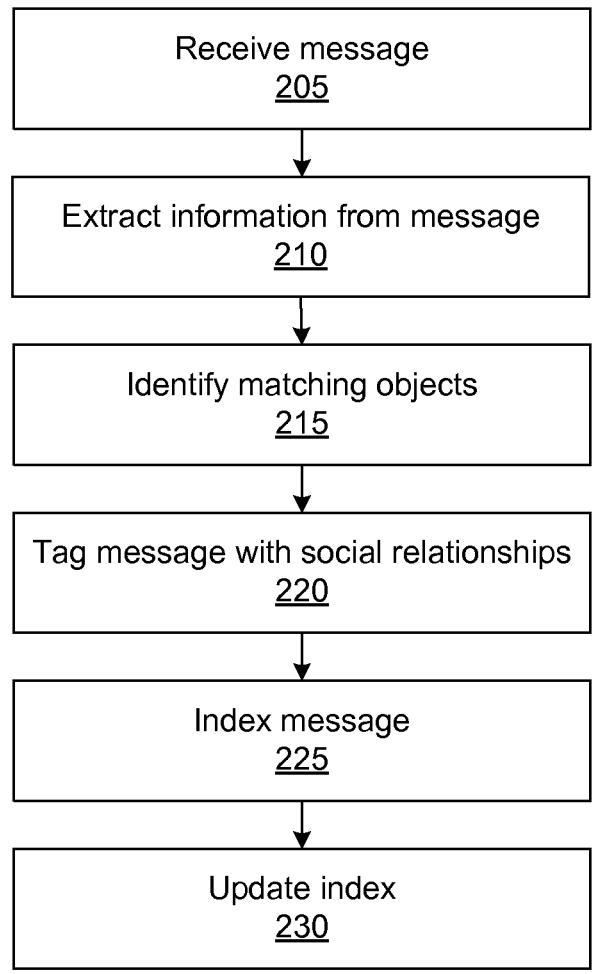
FIG. 2 is a flowchart of a method for indexing and organizing messages for a user of a social networking system using social network information, according to one embodiment.

The indexing engine 140 itself contains a number of sub-modules 141-145. Extraction module 141 receives messages and extracts information from the messages. Identification module 142 identifies objects in the social graph that match the extracted information, such as the sender and recipient of the message. Tagging module 143 tags the messages with the relationships of the objects in the social graph. Indexing module 144 indexes the messages into message indexes using the tags. Updating module 145 updates the indexed messages as necessary to reflect changes in the social graph. The detailed operation of these various modules will be described by reference to FIG. 2, which illustrates a flowchart of a method for indexing and organizing messages for a user of a social networking system using social network information, according to one embodiment.

The extraction module 141 receives 205 a message that is directed to a user of the social networking system 100. As explained previously, a message can be in any electronic message format. The extraction module 141 can receive the message, for example, from a client 180 or a third party website 190 in real-time as the message enters the social networking system 110. Alternatively, the message may already be stored in the object store 110 and retrieved by the extraction module 141 so that the message can be indexed.

The extraction module 141 extracts 210 information (the "extracted information") from the received message. In one embodiment, the extracted information includes information that can be used to identify the sender and recipient of the message. For example, information extracted from the metadata associated with a message may include the name of the user who sent the message, the name of the user who received the message, the sender's e-mail address, the recipient's e-mail address, or a unique identifier associated with a sender or recipient of the message. In another embodiment, the extracted information includes information related to the content of the message itself. For example, the extracted information can include the title of the message, URL's embedded in the body of the message, an image attached to the message, a time-stamp associated with the message, etc.

The identification module 142 identifies 215 objects in the social graph that match the extracted information. In one embodiment, the graph search module uses the extracted information to identify the object that is the intended recipient of the message (the "message recipient") and the object that sent the message (the "message sender"). For example, if an e-mail message is sent to "jeremy1234@facebook.com" and this e-mail address is associated with a particular user object, then the system identifies that user object as the message recipient.

In another embodiment, the identification module 142 also uses the extracted information to identify other objects that are related to the content of the message (the "related objects"). For example, the URL "www.yankees.com" may be extracted from the content of a message. In the object store 110, this URL is associated with an object for the baseball team the NEW YORK YANKEES. As such, the identification module identifies the object that corresponds to the NEW YORK YANKEES as a related object for the message.

Because the object store 110 is extremely large, it may be inefficient to search the entire object store 110 for objects that match the extracted information. Instead, it may be more efficient to identify matching objects by searching objects that are socially relevant to the message recipient. In one embodiment, the identification module 142 first identifies the message recipient. The identification module 142 then traverses the social graph to identify first-order and second-order user connections of the message recipient that match the extracted information. Specifically, the identification module 142 identifies a set of objects comprising the first-order connections of the message recipient. The identification module 142 then further identifies a set of all the first-order connections of the objects within the identified set, this latter set of connections constituting the second-order connections of the message recipient. From these objects, the identification module 142 identifies objects (e.g. message sender or related objects) that match the extracted information.

It is appreciated that although the identification module 142 has been described as identifying first- and second-order connections, any number of orders of connection could be identified. For example, the identification module 142 could also identify third order connections, in addition to those of first and second order. The exact configuration of the identification module 142 can be specified by settings provided by an administrator of the social networking system 100.

The tagging module 143 tags 220 a message with social network information. Tagging comprises identifying social relationships from the social graph and associating the message with the social relationships. In one embodiment, a message is tagged with social relationships between the message recipient and message sender. As discussed above, the relationship between one object and another is represented in the social graph with one or more edges. Each edge is also associated with a label (e.g. "friend", "family") and an affinity. A message may be tagged, in one embodiment, by associating these labels or affinities with the message. If there is more than one edge linking the message recipient and message sender, the message can be tagged with more than one label. For example, Adam and Bob may be connected by one edge with the label "friend" and another edge with the label "high school classmates." If Adam sends a message to Bob, the message is tagged with both of these labels. Further, if Adam and Bob are second-order friends that are indirectly connected by two serially connected edges in the social graph, the message can be tagged as being from a "friend of a friend."

As another example, multiple user objects may be members of a user-created social group within the social networking system 100. Group members can post messages to the group, which are then delivered to other group members. A group may be to an object in the social graph, and members of the group are linked to the group via edges of the social graph. If a message recipient and a message sender are both members of the same group, the message can be tagged with a social relationship indicating that the message is from a fellow group member. To illustrate, suppose that Adam and Bob are members of the group "Vegas 2011." Messages sent from Adam to Bob would be tagged with the relationship "Vegas 2011."

In another embodiment, the tagging module 143 tags each message based on the social relationship between the message recipient and any related objects. For example, Bob may be the message recipient. The object store 110 contains an object for the NEW YORK YANKEES. The website www.yankees.com is located within the content of the message, which is used to identify the YANKEES object as being related to the message. Bob is connected to the YANKEES object through an edge that has the label "fan of." Therefore, the tagging module 143 tags the incoming message with the "fan of" label. Alternatively or additionally, the tagging module 143 can tag the message with an identifier for the related object, such as the object name, which in this example is YANKEES.

The indexing module 144 indexes 225 the message using the social relationships associated with the message. Indexing messages enables the social networking system 100 to efficiently process and generate a set of messages based on social relationship criteria. In one embodiment, each user object is associated with a message index and any messages that are intended for the user object (e.g. if the object is the message recipient) are indexed into the message index. In a further embodiment, each user object may be associated with multiple message indexes, each of which is designated to store messages associated with a particular social relationship. For example, there may be one message index for messages tagged with a "friend" relationship and a separate message index for messages tagged with a "high school classmates" relationship. In such an embodiment, a single message that is associated with multiple social relationships can be indexed into more than one message index.

In one embodiment, a message index may contain several data fields for storing information about each indexed message. Because the contents of a message itself are stored in the object store 110, each entry in the index may include a data field that specifies the location of the message contents in the object store 110. Each entry may further include one or more data fields for the social relationship information (e.g., friends, friends of friends, degree of connection, affinity, etc.) that is associated with the message. In addition, each entry may also contain any other information that is appropriate for storing in an index, such as the title of the message, the sender of the message, a time-stamp associated with the message, etc. The indexing module 144 then stores the indexes into the message index store 150.

In some embodiments, a message may have multiple recipients. For each recipient, the indexing module 144 indexes the message using the social relationships corresponding to the recipient. This includes social relationships between the message recipient and the message sender as well as the social relationships between the message recipient and the other recipients. For example, suppose Adam sends an e-mail to both Bob and Charles. The e-mail can be indexed into Bob's message index using Bob's social relationships with Adam and Charles. The e-mail can also be indexed into Charles' message index using Charles' social relationships with Adam and Bob.

The updating module 145 updates 230 the message indexes to reflect new changes in the social graph. As described above, a user's social graph is dynamic and the relationship between objects in the social graph can change over time. Changes in the social graph can affect the social relationship information associated with the messages. For example, a message that was tagged as being from a "friend of a friend" may later need to be updated as being from a "friend" if the message recipient becomes friends with the sender of the message. The updating module 145 can be configured to update the indexes on a periodic basis. Alternatively, the updating module 145 can update the indexes whenever the number of changes to the social graph for a user exceeds a certain threshold. For example, the updating may occur whenever a user adds more than three new friends.

Once the indexes are created and stored in the message index store 150, the post-processing module 155 utilizes the indexes to enable a variety of uses. In one embodiment, the post-processing module 155 organizes messages using social relationship information from the message indexes. For example, a user's messages may be collected into an mailbox of messages and organized within the mailbox based the social relationship tag for each message. The organized messages are output in a user interface to a client 180 for display to a user of the social networking system or output to a third party website 190 through the API 150.

Organizing messages in this way allows a user to easily identify messages that are socially relevant. Socially relevant messages can be presented in a manner that emphasizes their importance, whereas less socially relevant messages can be presented in a manner that emphasizes their lack of importance.

In one embodiment, the post-processing module 155 organizes messages by filtering messages using social relationship information. For example, a user of the social networking system may request to view messages in his mailbox received from "friends of friends" by entering a command in a user interface. As such, the post-processing module 155 accesses the message indexes to identify messages that are tagged with the social relationship "friends of friends". The post-processing module 155 then outputs this set of messages to the user, while hiding or not outputting messages tagged with other social relationships.

Figure 3:
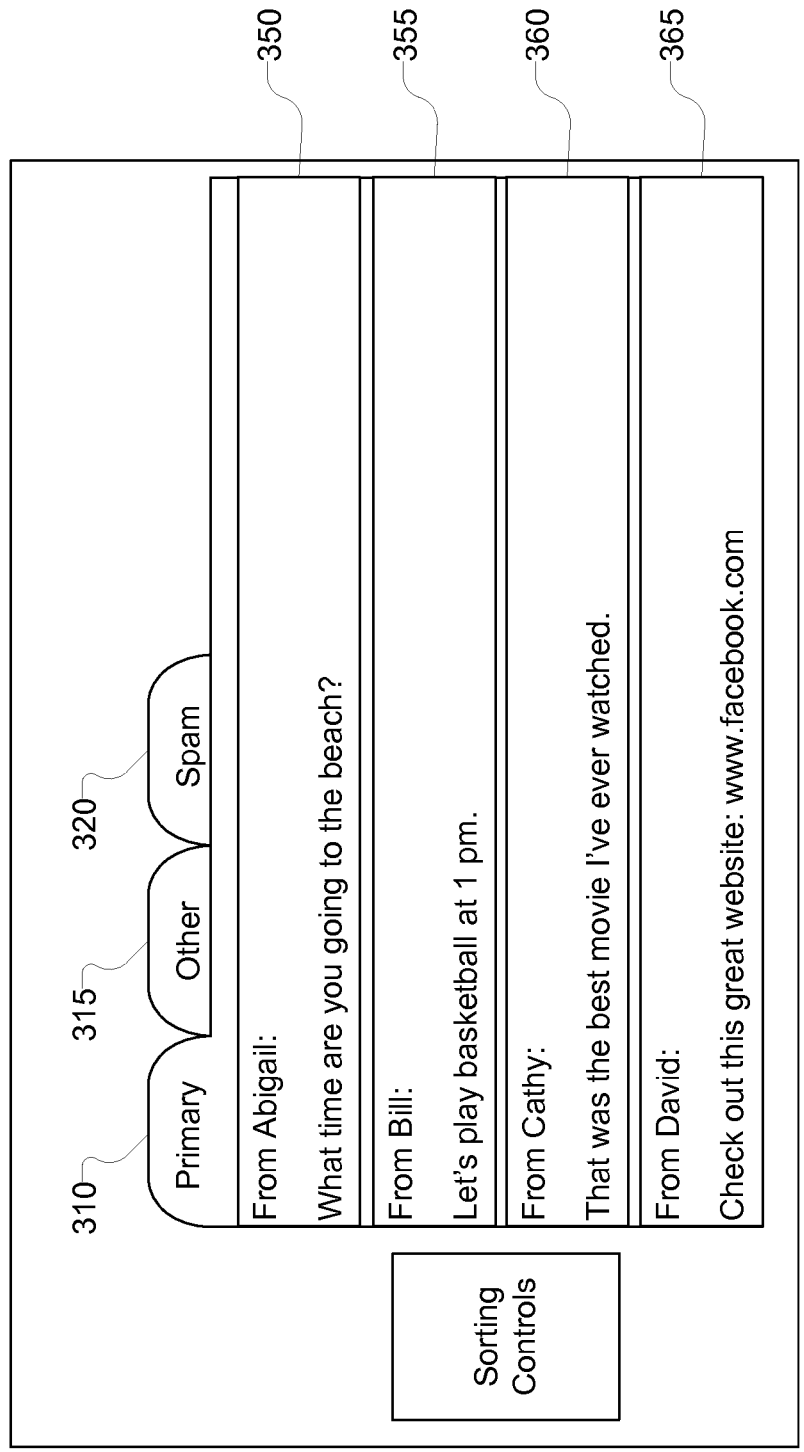
FIG. 3 illustrates a user interface for organizing messages for a user of a social networking system using social network information, according to one embodiment.

In a related embodiment, the post-processing module 155 organizes messages by categorizing messages using social relationship information. Messages can be categorized by placing the messages into individual folders. Each folder contains a sub-set of a user's messages that are placed into the folder based on their perceived relevance. For example, referring to FIG. 3, illustrated is a user interface for organizing messages for a user of a social networking system using social network information, according to one embodiment. As shown, the user interface has interactive tabs 310-320 that allow messages to be placed into different folders. Tab 310 represents the "primary" folder of the user's mailbox, and contains messages tagged as being from friends. Tab 315 is for "other" messages, such as messages tagged as being from friends of friends, from group members, or messages tagged with other types of social relationships. Tab 320 is for "spam" messages, such as messages that are not tagged with any social relationship. Here, the user has selected the primary tab 310, which causes the post-processing module 155 to access the message indexes in the message index store 150 to identify messages that are tagged with a friend relationship. The post-processing module 155 then outputs a set of messages 350-365 received from the user's friends.

In another embodiment, social relationships are only one of many factors used to categorize messages. Other factors may include, for example, whether the message includes malicious information as determined by a virus-scanning tool, whether the sender of a message is a known source of spam, or whether the message contains an attachment. By considering social relationships along with other factors, a message can be accurately placed into a folder that best corresponds to the perceived importance of the message. In other embodiments, each tab (e.g. primary 310, other 315, spam 320) may be its own separate window that is simultaneously displayed side by side with other windows.

In another embodiment, the post-processing module 155 organizes messages by sorting (i.e. ordering) messages based on social relationship information. Different types of social relationships can be prioritized such that messages tagged with one type of social relationship (e.g., friends) are displayed higher in a list than messages tagged with other types of social relationships (e.g., friends of friends). Messages can also be sorted based on the strength of a social relationship. For example, the post-processing module 155 may sort messages within a mailbox in descending order based on a user's affinity for the sender of the message. Messages from persons that a user has a high affinity for are pushed to the top of the mailbox, while messages from persons that a user has a low affinity for are pushed to the bottom of the mailbox. Additionally, messages may be sorted according to a default policy or sorted according to a user input entered via the user interface.

In another embodiment, the post-processing module 155 generates messages for display by changing the appearance of a message based on the social relationship associated with the message. For example, messages from family members may be displayed with a green color while messages from co-workers may be displayed with a yellow color. The appearance of a message can be changed in any manner that is visually distinctive, such as with color, highlighting, bolding, etc.

In a further embodiment, the post-processing module 155 generates messages that match a search query and are also tagged with a certain social relationship. For example, a user of a client 180 may enter a textual query for the keyword "party" in messages received from users that are "friends of friends." The post-processing module 155 then uses the message indexes to identify messages that are tagged with the social relationship "friends of friends" and executes the keyword search on those messages.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving a message directed to a recipient, the recipient being a user of a social networking system;
identifying an object of the social networking system associated with the message;
accessing a social networking system database that includes social information about a relationship between the recipient and the identified object of the social networking system;
storing, by a computer, an index entry for the message in a message index, the index entry for the message in the message index comprising a reference to the message in association with the social information about the relationship between the recipient and the identified object of the social networking system, wherein the reference to the message is a reference to the message in a message data store that stores the message;
identifying a change in the social information about the relationship between the recipient and the identified object of the social networking system; and
updating the index entry for the message in the message index based on the change in the social information about the relationship between the recipient and the identified object of the social networking system.

2. The method of claim 1, further comprising:
providing a user interface to the user of the social networking system, the user interface displaying a plurality of messages associated with the user;
accessing the index to obtain social information for each of the plurality of messages; and
organizing the messages in the user interface based at least in part on the social information associated with at least a set of the messages.

3. The method of claim 2, wherein the organizing comprises filtering one or more of the messages based on the social information.

4. The method of claim 2, wherein the organizing comprises categorizing one or more of the messages based on the social information.

5. The method of claim 2, wherein the organizing comprises sorting one or more of the messages based on the social information.

6. The method of claim 1, wherein the object comprises a sender of the message.

7. The method of claim 6, wherein the social information comprises a degree of connection between the recipient of the message and the sender of the message in the social networking system.

8. The method of claim 6, wherein the sender comprises a user entity of the social networking system.

9. The method of claim 6, wherein the message index indexes the message according to a degree of connection between the recipient and the sender of the message in the social networking system.

10. The method of claim 1, wherein the object comprises another recipient of the message.

11. The method of claim 1, wherein the social information comprises the recipient's affinity for the object.

12. The method of claim 1, wherein the social information comprises whether the recipient of the message and the identified object have established a connection in the social networking system.

13. The method of claim 1, wherein the message is at least one of an electronic mail message, a chat message, a text message, or a comment on a webpage.

14. A computer program product comprising a non-transitory computer-readable storage medium containing computer code for:
receiving a message directed to a recipient, the recipient being a user of a social networking system;
identifying an object of the social networking system associated with the message;
accessing a social networking system database that includes social information about a relationship between the recipient and the identified object of the social networking system;
storing an index entry for the message in a message index, the index entry for the message in the message index comprising a reference to the message in association with the social information about the relationship between the recipient and the identified object of the social networking system, wherein the reference to the message is a reference to the message in a message data store that stores the message;
identifying a change in the social information about the relationship between the recipient and the identified object of the social networking system; and
updating the index entry for the message in the message index based on the change in the social information about the relationship between the recipient and the identified object of the social networking system.

15. The computer program product of claim 14, further comprising code for:
providing a user interface to the user of the social networking system, the user interface displaying a plurality of messages associated with the user;
accessing the index to obtain social information for each of the plurality of messages; and
organizing the messages in the user interface based at least in part on the social information associated with at least a set of the messages.

16. The method of claim 1, further comprising:
storing contents of the message in the message datastore, wherein the reference to the message in the message datastore comprises a location of the contents of the message in the message datastore.

17. The computer program product of claim 14, further comprising code for:
storing contents of the message in the message datastore, wherein the reference to the message in the message datastore comprises a location of the contents of the message in the message datastore.

\* \* \* \* \*